US012642376B1

(12) United States Patent
Murack et al.

(10) Patent No.: US 12,642,376 B1
(45) Date of Patent: Jun. 2, 2026

(54) DRINKING VESSEL WITH SURFACE INDENTATIONS FOR DECORATIVE WRAP INSERTS

(71) Applicants: David Murack, Sarasota, FL (US); Michele Davalos, Sarasota, FL (US)

(72) Inventors: David Murack, Sarasota, FL (US); Michele Davalos, Sarasota, FL (US)

(*) Notice: Subject to any disclaimer, the term of this patent is extended or adjusted under 35 U.S.C. 154(b) by 0 days.

(21) Appl. No.: 18/433,615

(22) Filed: Feb. 6, 2024

Related U.S. Application Data

(60) Provisional application No. 63/460,637, filed on Apr. 20, 2023.

(51) Int. Cl.

| | |
|---|---|
| ***A47G 19/22*** | (2006.01) |
| ***B65D 25/36*** | (2006.01) |
| ***G09F 7/18*** | (2006.01) |
| ***G09F 23/00*** | (2006.01) |

(52) U.S. Cl.

CPC ......... *A47G 19/2227* (2013.01); *B65D 25/36* (2013.01); *G09F 7/18* (2013.01); *G09F 23/00* (2013.01); *B65D 2313/04* (2013.01); *G09F 2007/1852* (2013.01)

(58) Field of Classification Search

CPC ............ B65D 23/0857; B65D 23/0842; B65D 23/0885; B65D 2203/02; B65D 25/36; B65D 2313/04; B65D 25/205; A47G 19/2227

See application file for complete search history.

(56) References Cited

U.S. PATENT DOCUMENTS

| | | | | |
|---|---|---|---|---|
| 9,150,331 | B2 * | 10/2015 | Kisela | B65D 81/3837 |
| 10,556,723 | B2 * | 2/2020 | Lee | B65D 23/104 |
| 2006/0156603 | A1 * | 7/2006 | Richards | G09F 23/06 40/665 |
| 2015/0047999 | A1 * | 2/2015 | Spain | A47G 19/2227 206/459.5 |

* cited by examiner

*Primary Examiner* — Jeffrey R Allen

(74) *Attorney, Agent, or Firm* — Bryan L. Loeffler. , Esq.; LOEFFLER IP GROUP, P.A.

(57) ABSTRACT

A reusable drinking vessel (1) having interchangeable decorative wrap inserts (11) that eliminate the need for having multiple unique drinking vessels for each holiday, sport, or special event.

1 Claim, 2 Drawing Sheets

DRINKING VESSEL WITH SURFACE INDENTATIONS FOR DECORATIVE WRAP INSERTS

CROSS-REFERENCE TO RELATED APPLICATION

This application is a continuation of application No. 63/460,637 filed on Apr. 20, 2023, which is incorporated herein by reference in its entirety to provide continuity of disclosure.

FIELD OF THE INVENTION

This invention relates generally to insulated drinking vessels and, more particularly, to a drinking vessel having interchangeable wraps inserts that allow a user to change the aesthetic of the drinking vessel.

BACKGROUND OF THE INVENTION

Double walled drinking vessels, such as tumblers and travel mugs, are commonly used to hold water, coffee, and other beverages. These conventional drinking vessels come with fixed colors and/or decorations that may represent a favorite sports team, holiday, season, or other personal interests, thereby requiring the purchase and storage of multiple drinking vessels to represent each interest or event.

Therefore, a need exists for a drinking vessel having interchangeable wraps and/or inserts that allow a user to change the aesthetic of the drinking vessel to represent a desired interest or event.

SUMMARY OF THE INVENTION

The primary object of the present invention is to provide a single drinking vessel that may be used to represent a variety of desired aesthetics, thereby eliminating the need for having multiple unique drinking vessels for each holiday, sport, etc.

The present invention fulfills the above and other objects by providing a reusable drinking vessel, such as a tumbler, coffee mug, travel cup, or water bottle, wherein the drinking vessel comprises a perimeter wall, a bottom, an open mouth, and a rim around the open mouth. The perimeter wall of the drinking vessel is preferably double walled and/or has a thickness that allows one or more indentations in an outer surface of the perimeter wall.

Each indentation is shaped to correspond to a decorative insert having a matching shape. Each decorative insert may be matched and inserted into its corresponding indentation on the drinking vessel cup so that each decorative insert is recessed within its respective indentation and the perimeter wall. Each decorative insert preferably has a thickness that is equal to a depth of its corresponding indentation, thereby making each attached decorative insert flush with the outer surface of the perimeter wall. The indent may also be a channel encircling the perimeter wall and wherein the decorative insert is a rectangular-shaped wrap.

Each decorative insert is interchangeable and removably attachable to the perimeter wall via a non-permanent attachments, thereby making the same drinking vessel customizable to special events, holidays, seasons, outings, users personal interests, and so forth.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 2:
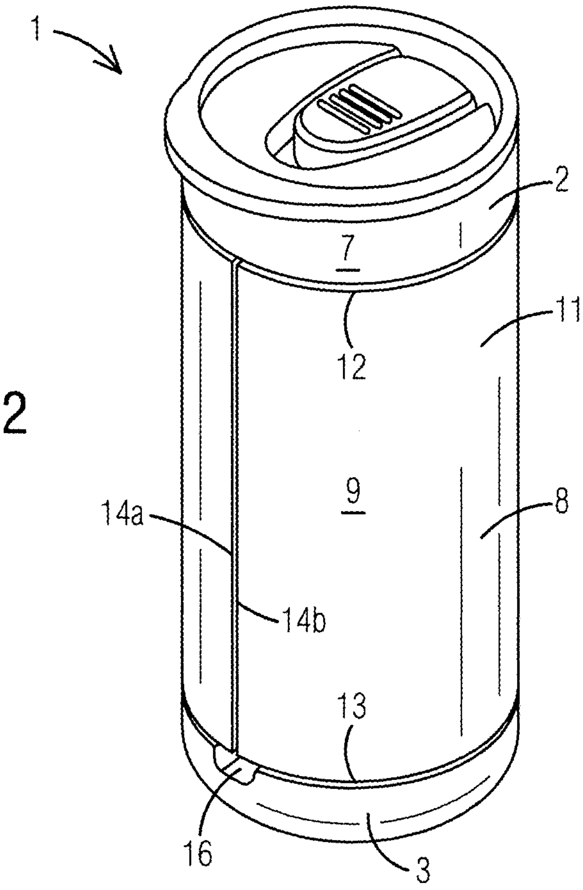
FIG. 2 is a side perspective view of a drinking vessel of the present invention having an indentation encircling the perimeter wall and a wrap-style decorative insert recessed within the indentation.
Figure 1:
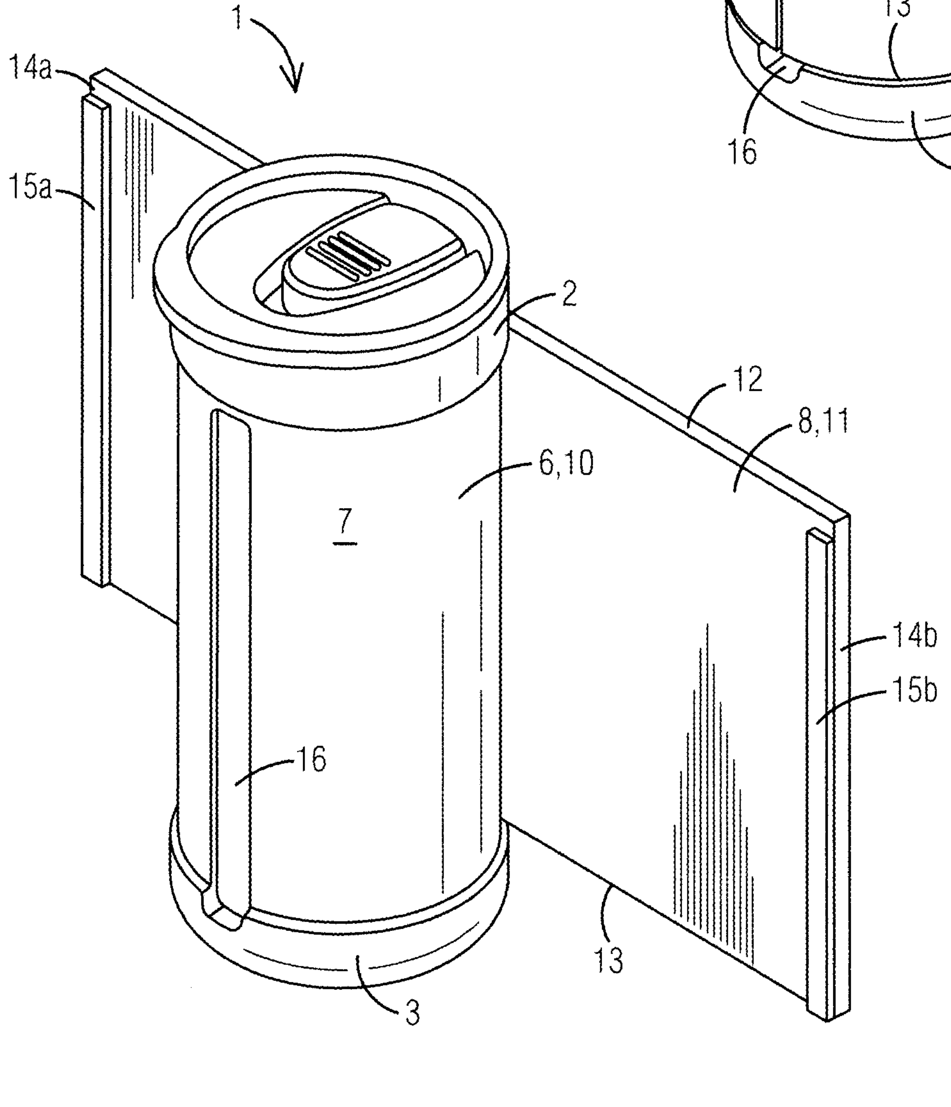
FIG. 1 is an exploded side perspective view of a drinking vessel of the present invention having an indentation encircling the perimeter wall and a wrap-style decorative insert.
Figure 3:
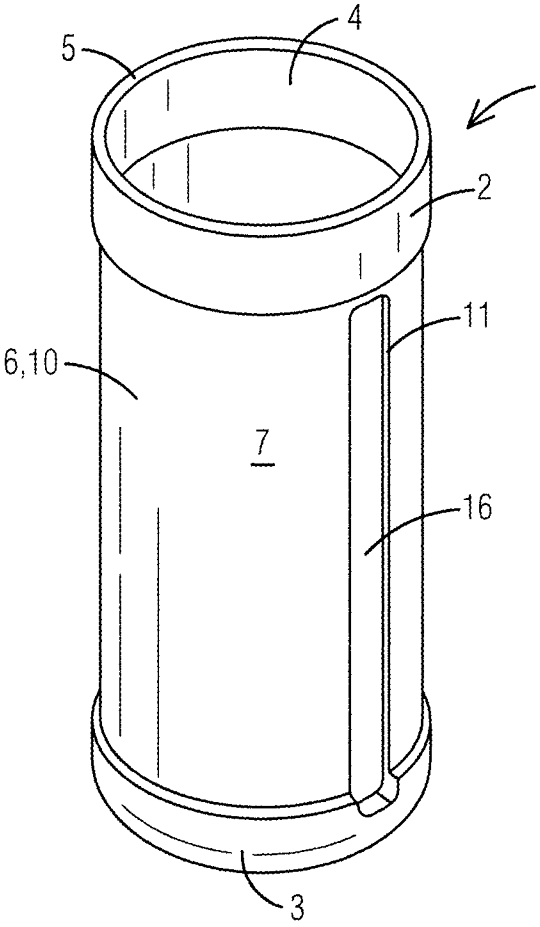
FIG. 3 is a side perspective view of a drinking vessel of the present invention having a indentation encircling the perimeter wall.
Figure 4:
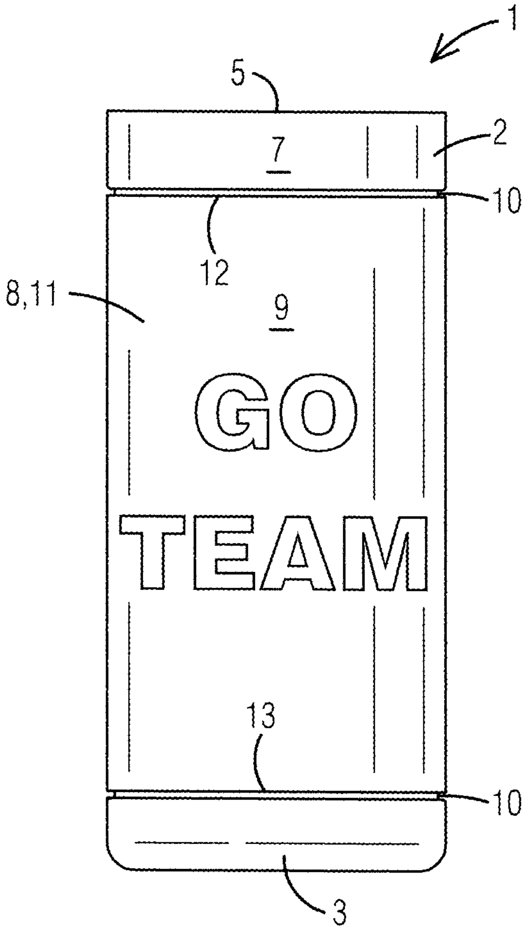
FIG. 4 is a side perspective view of a drinking vessel of the present invention having a circular-shaped indentation on the perimeter wall and a circular-shaped decorative insert recessed within the indentation.

For purposes of describing the preferred embodiment, the terminology used in reference to the numbered accessories in the drawings is as follows:

1. drinking vessel, generally
2. perimeter wall
3. bottom
4. open mouth
5. rim
6. indentation
7. outer surface of perimeter wall
8. decorative insert
9. outer surface of decorative insert
10. channel
11. wrap
12. top edge of wrap
13. bottom edge of wrap
14*a*. first side edge of wrap
14.*b* second side edge of wrap
15*a*. first magnetic strip
15*b*. second magnetic strip
16. vertically oriented groove With general reference to FIGS. 1-4, the present invention comprises a reusable drinking vessel 1, such as a tumbler, coffee mug, travel cup, or water bottle, wherein the drinking vessel 1 comprises a perimeter wall 2, a bottom 3, an open mouth 4, and a rim 5 around the open mouth 4. The perimeter wall 2 of the drinking vessel 1 is preferably double walled and/or has a thickness that allows one or more indentations 6 to be placed on an outer surface 7 of the perimeter wall 2. Each indentation 6 is shaped to correspond to a decorative insert 8 having a matching shape, thereby allowing a corresponding decorative insert 8 to be inserted into the appropriate indentation 6 on the drinking vessel 1 so the decorative insert 8 is recessed within the corresponding indentation 6 while an exposed outer surface 9 of the decorative insert 8 is even with the outer surface of the perimeter wall 2, thereby resulting in a completely flush outer surface between the drinking vessel 1 and the decorative insert 8, as illustrated in FIG. 4.

Each decorative insert 8 is interchangeable and removably attachable to the perimeter wall 2 via a non-permanent attachment means. A decorative insert may be held within its respective indentation using a magnet, an adhesive, a tubular-shaped wrap having elastomeric qualities, a snap-fit, a friction fit, hook and loop faster, or equivalent means.

As illustrated herein, an indented channel 10 encircles the perimeter wall 2 and the decorative insert 8 is a rectangular-shaped wrap 11. The rectangular-shaped wrap 11 preferably comprises a top edge 12, a bottom edge 13, and opposing side edges 14*a*, 14*b* having an attachment means, such as, located thereon that allows a user to secure that wrap 11 around the drinking vessel 1.

As illustrated herein, a vertically oriented groove 16 is located within the channel 10 in which the magnetic strips 15*a*, 15*b* are recessed to provide the flush surface with the drinking vessel 1. Additional magnets and/or material that is attracted to magnets may be located within the vertically oriented groove 16.

Each insert may have a desired color, graphic design, logo, message, or other indicia printed thereon. A user may then swap out decorative inserts on a single drinking vessel, thereby making the same drinking vessel customizable to special events, holidays, seasons, or outings and eliminating the need to have individual drinking vessels for each occasion or desired theme.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

We claim:

1. A reusable drinking vessel comprising:

a perimeter wall, a bottom, an open mouth, and a rim around the open mouth;

an indented channel encircling the perimeter wall and a rectangular-shaped wrap wherein the rectangular-shaped wrap has a top edge, a bottom edge, and opposing side edges;

wherein the rectangular-shaped wrap may be inserted into the indented channel so that the rectangular-shaped wrap is flush with an outer surface of the perimeter wall;

magnetic strips located on the opposing side edges of a rear surface of the rectangular-shaped wrap wherein the magnetic strips extend from the rear surface; and at least one vertically oriented groove located within the indented channel that creates a recessed area within the indented channel in which the magnetic strips may be inserted to attach the rectangular-shaped wrap within the indented channel and to the perimeter wall while creating a substantially flush surface between the rectangular-shaped wrap and the drinking vessel.

* * * * *